US009334988B2

(12) United States Patent
Gallagher et al.

(10) Patent No.: US 9,334,988 B2
(45) Date of Patent: May 10, 2016

(54) TELESCOPING PIPE CONNECTOR

(71) Applicant: Oil States Industries (UK) Limited, Aberdeen (GB)

(72) Inventors: John Gallagher, Aberdeenshire (GB); Martin James Ward, Aberdeenshire (GB)

(73) Assignee: Oil States Industries (UK) Limited, Aberdeen (GB)

( * ) Notice: Subject to any disclaimer, the term of this patent is extended or adjusted under 35 U.S.C. 154(b) by 0 days.

(21) Appl. No.: 14/272,976

(22) Filed: May 8, 2014

(65) Prior Publication Data

US 2014/0353963 A1    Dec. 4, 2014

(30) Foreign Application Priority Data

May 30, 2013  (GB) .................................. 1309726.6
Feb. 25, 2014  (WO) ................. PCT/GB2014/005062

(51) Int. Cl.
*F16L 21/00*    (2006.01)
*F16L 19/00*    (2006.01)
*F16L 25/06*    (2006.01)

(52) U.S. Cl.
CPC ............. *F16L 19/005* (2013.01); *F16L 25/065* (2013.01)

(58) Field of Classification Search
USPC .......................... 285/403, 404, 90, 91, 31, 32
See application file for complete search history.

(56) References Cited

U.S. PATENT DOCUMENTS

| 1,570,155 | A | * | 1/1926 | Karbowski ..................... 285/328 |
| 2,926,027 | A | * | 2/1960 | Marquis, Jr. ..................... 285/32 |
| 3,653,691 | A |   | 4/1972 | Bram |
| 3,971,574 | A |   | 7/1976 | Curtin |

(Continued)

FOREIGN PATENT DOCUMENTS

| EP | 0034436 | 8/1981 |
| EP | 0158455 | 10/1985 |
| GB | 2199102 | 6/1988 |

OTHER PUBLICATIONS

GB1309726.6 British Search Report, 4 pages, dated Nov. 25, 2013.

(Continued)

*Primary Examiner* — Aaron Dunwoody
(74) *Attorney, Agent, or Firm* — Boyle Fredrickson, S.C.

(57) ABSTRACT

A pipe connector comprises a first pipe section having a first end and having teeth formed on its outer surface proximate to, but spaced axially apart from, the first end. A second pipe section has a second end which, in use, is to be connected to the first end of the first pipe section. A sleeve is slidably mounted on the outer surface of the second pipe section for movement between a first extended position, in which a front end of the sleeve projects beyond the second end of the second pipe section so as, in use, to overlap the first end of the first pipe section when abutted against the second end of the second pipe section, and a second retracted position in which said front end is withdrawn so as at least to be aligned with the second end of the second pipe section, the sleeve having teeth formed on its outer surface at least in the region of the front end. A stop is provided on the second pipe section and the sleeve to prevent axial movement of the sleeve beyond the extended position. A lock ring is also provided having teeth formed on its inner cylindrical surface which are sized to engage both the teeth of the first pipe section and the teeth of the sleeve when the sleeve is overlapping the first end of the first pipe section so as to lock said first pipe section and the sleeve together against relative axial movement.

14 Claims, 4 Drawing Sheets

(56) References Cited

U.S. PATENT DOCUMENTS

| | | | |
|---|---|---|---|
| 4,043,575 A * | 8/1977 | Roth | 285/90 |
| 4,280,719 A * | 7/1981 | Daniel et al. | 285/90 |
| 4,547,003 A | 10/1985 | McGugan | |
| 5,011,193 A * | 4/1991 | Porte | 285/31 |
| 5,355,908 A * | 10/1994 | Berger et al. | 137/614.04 |
| 5,441,310 A * | 8/1995 | Barrett et al. | 285/18 |
| 5,607,019 A * | 3/1997 | Kent | 166/344 |
| 5,634,671 A * | 6/1997 | Watkins | 285/18 |
| 6,123,363 A * | 9/2000 | Burgard et al. | 285/24 |
| 6,318,761 B1 | 11/2001 | Robertson | |
| 6,328,343 B1 * | 12/2001 | Hosie et al. | 285/90 |
| 6,511,098 B1 * | 1/2003 | Luterstein | 285/81 |
| 8,381,808 B2 * | 2/2013 | Rogers et al. | 166/70 |
| 8,944,188 B2 * | 2/2015 | Lowry | 175/320 |
| 2003/0025324 A1 * | 2/2003 | Guesnon et al. | 285/81 |
| 2007/0152441 A1 * | 7/2007 | Jennings et al. | 285/90 |
| 2011/0260445 A1 * | 10/2011 | Watterson et al. | 285/91 |
| 2014/0103640 A1 * | 4/2014 | O'Dell et al. | 285/91 |

OTHER PUBLICATIONS

PCT/G82014/050562, International Search Report and Written Opinion, 12 pages, dated Apr. 28, 2014.

PCT/GB2014/050562, International Preliminary Report on Patentability, dated Dec. 10, 2015, 10 pages.

\* cited by examiner

TELESCOPING PIPE CONNECTOR

CROSS-REFERENCE TO RELATED APPLICATIONS

This application is a national phase entry of PCT/GB2014/0562 filed Feb. 25, 2014 which claims priority from application GB 1309726.6 filed May 30, 2013.

BACKGROUND OF THE INVINVENTION

1. Field of the Invention

The present invention relates to pipe connectors and more particularly to telescoping pipe connectors in which the end of one pipe engages in the end of the connecting pipe so that there is an overlap between the two.

2. Discussion of the Related Art

It is well known in the art that two pipes may be connected end to end using a flange type connection. In a typical flange type pipe connection, each pipe end has a flange formed on it, the two flanges abutting against each other when the two pipe ends are brought together. Fastening holes are formed in the two flanges around the entire periphery of the pipe ends through which fastening bolts extend to fasten the two flanges together. A seal with will normally be provided between the abutting faces of the two flanges to make the joint fluid tight.

Whilst this type of connection works well in some applications, due to the number of fastening bolts which are normally required with a large diameter pipe, disconnecting and reconnecting this type of joint, for example to replace or repair a damaged pipe section, can be very time consuming. As a result, flange type couplings are not suitable for use is harsh or remote environments due to the undesirableness of exposing workers to these environments for long periods of time.

An alternative pipe connector also known in the art which overcomes the problems associated with flange type connectors utilises a lock ring which extends across the end of the two pipes which are to be fastened so as to join them together. An example of this type of connector is shown in FIG. 1. With this type of connectors, one of the pipe members, referred to as the box member, has a cylindrical recess formed in its end which is sized to complement a cylindrical extension formed on the end of the other pipe member, referred to as the pin member, so that the end of the pin member may be slid into the end of the box member to form an overlapping connection therebetween. Usually, a seal such as an O-ring will be provided in the overlapping section.

The box and pin members both have circumferentially extending teeth formed on their outer surface proximate the connecting ends which complement circumferentially extending teeth which are formed on the inner surface of the locking ring. The locking ring is a slit ring which enables it to be expanded for fitting onto the end of the box member with its teeth engaged with the teeth on the box member to retain it thereon. The pin member is then driven axially into box member with sufficient power to expand the ring member through camming action between the teeth of the pin member and teeth of the locking ring until the pin member is fully engaged in the box member, whereupon the lock ring closes around the pin member with the teeth of the two members inter-engaged to prevent removal of the pin member from the box member.

In order to break the connection, the lock ring is expanded until its teeth are disengaged from the teeth on the pin member, whereupon the pin member may be axially withdrawn from the box member.

This connector is much easier and quick to connect and disconnect compared with the flange type connector. However, it has the problem that, in order to make and or break the connection, it is necessary to axially move one pipe end relative to the other in order to withdraw the pin member from the box member and also to withdraw the pin member from the collar. During initial assembly of a pipe string or line, or disassembly from one end, this is not an issue. However, in applications where is may be necessary to remove a pipe section from within a long pipe line, this is a problem as the neighbouring connections are the opposite ends of the pin, and box members will prevent the axial movement which is necessary to disconnect the pin member from the box member. As a result, this prior art connector is not suitable for applications where it may be necessary to break the pipe mid-section.

SUMMARY OF THE INVENTION

There is accordingly a need for a pipe connector which overcomes the problems of the flange type prior art system whilst still enabling a pipe section to be removed and replaced mid-pipeline, i.e. which does not require that the connecting pipe sections be axially moveable relative to each other.

According to the present invention there is provided a pipe connector comprising a first pipe member having a first end and having teeth formed on its outer surface proximate to but spaced axially apart from the first end; a second pipe member having a second end which, in use, is to be connection to the first end of the first pipe member; a sleeve slidably mounted on the outer surface of the second pipe member for movement between a first extended position, in which a front end of the sleeve projects beyond the second end of the second pipe member so as, in use, to overlap the first end of the first pipe member when abutted against the second end of the second pipe member, and a second retracted position in which said front end is withdrawn so as at least to be aligned with the second end of the second pipe member, the sleeve having teeth formed on it outer surface at least in the region of the front end; stop means provided on the second pipe member and the sleeve to prevent axial movement of the sleeve beyond the extended position; and a lock ring having teeth formed on its inner cylindrical surface and sized to engage both the teeth of the first pipe member and the teeth of the sleeve when the sleeve is overlapping the first end of the first pipe member so as to lock said first pipe member and the sleeve together against relative axial movement.

A pipe connector in accordance with the invention has the advantage that, by forming the locking teeth associated with the second pipe member on a moveable sleeve, it is no longer necessary to axially retract the pipe itself to make or break a connection with another pipe end—it is simply necessary to release the lock ring and retract the sleeve, whereupon the abutting pipe ends may be moved radially apart.

Preferably, the stops means is an increased diameter section formed on the outer surface of the second pipe member near to the second end of the second pipe member and a corresponding reduced diameter portion formed on the inner surface of the sleeve, which reduced diameter portion engages with the increased diameter portion of the second pipe member when the sleeve reaches its extended position. In particular, the second pipe member has a step change in external diameter which forms a shoulder which is engaged by a corresponding shoulder formed on the inner surface of the sleeve by a step change in the inner diameter of the sleeve.

Other configurations are, however, possible, such as tapered surfaces on the sleeve and second pipe member which engage against each other.

The teeth on the first pipe member and sleeve may be realised as distinct teeth which are distributed about the circumference of each of the first pipe member and the sleeve, but preferably take the form of at least one tooth on each of the first pipe member and the sleeve which extends around the entire circumference of each member.

Preferably, detent means are associated with the sleeve and/or the second pipe member which operate to deter movement of the sleeve along the second pipe member between the extended and retracted positions when the sleeve is not engaged by the lock ring. In particular, the detent means preferably comprises a split ring which is carried in a circumferential groove formed in the inner surface of the sleeve and which locates in one of a pair of circumferential grooves formed in the outer surface of the second pipe member in order to retain the sleeve in either the extended or the retracted positions.

A circumferentially extending seal is preferably provided around the outer surface of each of the first end of the first pipe member and the second end of the second pipe member, the seals being engaged by the inner surface of the sleeve when the first and second ends are abutted against each other and the sleeve moved to its extended position so as to seal the connection therebetween.

The lock ring is preferably a split ring and includes at least one radially extending through opening into which a release bolt may be screwed in order to expand the lock ring to release it from the sleeve.

In order that the invention may be well understood, there will now be described an embodiment thereof, given by way of example, reference being made to the accompanying drawings, in which:

DETAILED DESCRIPTION OF THE INVENTION

Figure 1:
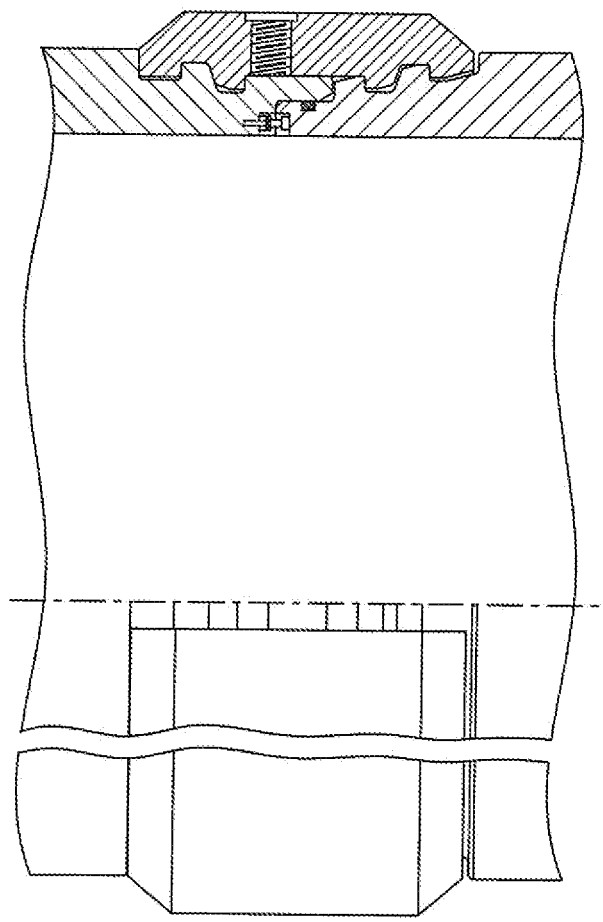
FIG. 1 is a sectional side view of a pipe connector according to the prior art.
Figure 2:
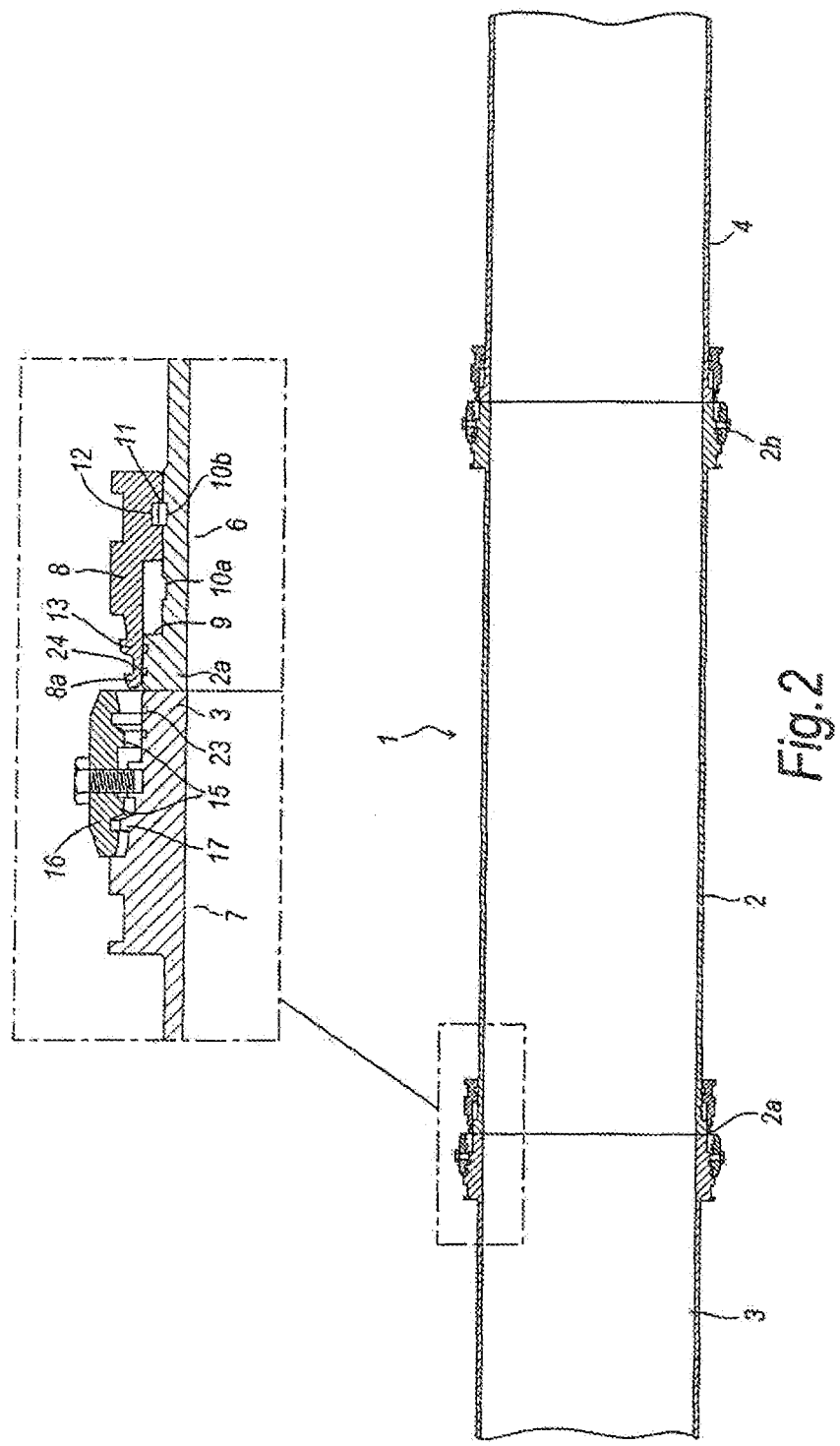
FIG. 2 is a side view of a pipe connector according to the invention is a disengaged configuration.

Referring first to FIG. 2, there is shown a portion of a pipeline 1 which includes a pipe section 2 connected to adjacent pipe ends 3, 4 using a pipe connector according to the invention.

Pipe section 2 has opposed ends 2a, 2b, with the first end 2a having a hub portion of the connector of the invention formed thereon for connecting with a pin portion carried on the adjacent pipe end 3, and the second end 2b having a pin portion of the connector of the invention formed thereon for connecting with a hub portion carried on the adjacent pipe end 4. The invention will be described in relation to the connection of the first end 2a of the pipe section 2 to the pipe end 3, but it will be understood that the connection of the second end 2b to the pipe end 4 mirrors that of the connection of the first end 2a.

As shown in the enlarged portion of FIG. 2, the connector of the invention is formed by abutting pin portion 6 and hub portion 7 which have abutting ends 3, 2a which are of matching external (and in the illustrated embodiment internal) diameters. Mounted on the outer surface of the pin portion 6 is a locking sleeve 8 which is slidably moveable along the outer surface of the pipe section 2 between an extended position, shown in FIG. 3, in which the end 8a of the sleeve 8 extends beyond the first end 2a of the pipe section 2 and overlaps the abutting end 3 of the adjacent pin portion 6, thereby preventing relative radial movement between the pipe ends 2a, 3, and a retracted position, shown in FIG. 2, in which the sleeve 8 is slid back along the pipe section 2 away from the adjacent pipe end 3 so that the end 8a of the sleeve 8 is no longer extends beyond the first end 2a and the pipe end 3 is free to move radially relative to the first pipe end 2a.

A radial shoulder 9 is formed on the outer surface of the pipe section 2 proximate to the first end 2a by a step decrease in the external diameter of the pipe section 2, which shoulder 9 forms a stop to limit the movement of the sleeve 8 along the pipe section 2 towards the first end 2a. The pipe section 2 furthermore includes a pair of circumferentially extending, axially space apart grooves 10a, 10b in its outer surface, which grooves 10a, 10b co-operate with a split ring 11 carried in a groove 12 formed in the inner surface of the sleeve 8 to retain the sleeve in either its extended or retracted position. Although in the illustrated embodiment the hub portion 7 is shown with the stop in the form of a shoulder, it will be understood that other forms of stop may also be utilised, it being important only that the sleeve 8 be limited in its movement along the pipe section 2 towards the first end 2a and hence lock the pipe section 2 against axial movement away from the adjacent pipe end 3 once the sleeve has been locked to the pin portion 6 as described below.

The outer surface of the sleeve 8 furthermore includes a number of circumferentially extending ridges or teeth 13 proximate to its end 8a. The leading flanks of the teeth 13 are ramped so as to facilitate engagement with internal teeth 15 formed in the inner surface of a locking ring 16 which operates to lock the sleeve 8 to the pin portion 6.

The pin portion 6 also includes a circumferentially extending ridge or tooth 17 on its outer surface, the leading flanks of which are also ramped to facilitate engagement with internal teeth 15 formed on the locking ring 16.

Figure 3:
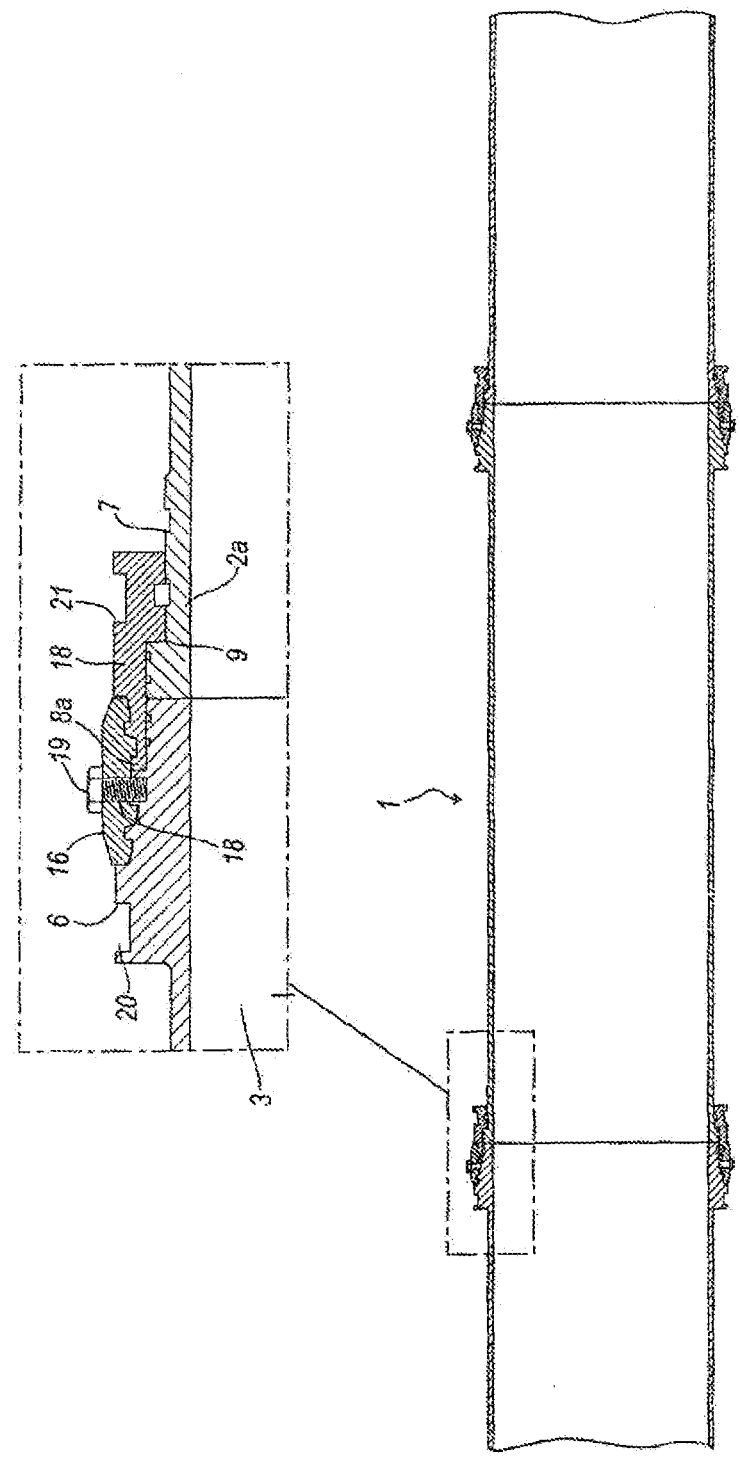
FIG. 3 is a side view of the pipe connector of FIG. 2 in an engaged configuration.

The final component of the connector is the locking ring 16, which is a split ring which is engageable around the pin portion 6 and sleeve 8 of the hub portion, when it is in its extended position, to lock the pin and hub together against relative axial movement therebetween. The locking ring 16 has internal teeth 15 which are spaced so as to engage with the teeth 13, 17 of both the pin and the sleeve when the pipe ends 2a, 3 are abutting and the sleeve 8 is in its extended position as shown in FIG. 3. The locking ring 16 also has a threaded radial hole 18 into which release bolt 19 may be screwed so engage the outer surface of the pin portion 6 and impart an expanding load to the locking ring to open it to enable release of the connector as described below.

The connector is operated as follows:

The locking ring 16 is first positioned on the pin portion 6 with its teeth 15 engaged with the teeth 17 of the pin portion 6 as shown in FIG. 2. The inclined flanks of the teeth 17 enable the ring 16 to be driven axially onto the pin portion 6, the teeth 17 developing a camming action with the teeth 15 of the ring 16 which causes the ring 16 to open when sufficient force is applied to the end of the ring 16, thereby enabling it to be moved fully onto the pin portion 6.

With the sleeve 8 in its retracted position, the first end 2a of the pipe section 2 is aligned with and brought into abutment with the abutting pipe end 3 as shown in FIG. 2. Since the sleeve 8 is fully retracted onto the pipe portion 2, no axial movement of the pipe portion 2 is necessary to achieve the required positioning—it is simply necessary to move the pipe section radially into alignment with the pin portion 6.

The sleeve 8 is then drive towards its extended position by applying sufficient force to its trailing end to release the split ring and also to enable the camming action developed between the leading flanks of the teeth 13 and the teeth 15 of the ring to expand the 16 and enable the sleeve to fully under the ring 16 to bring the teeth 15 of the ring 16 into full engagement with the teeth 13 of the sleeve as shown in FIG. 3. Each of the pin portion 6 and the sleeve 8 include actuating grooves 20, 21 into which a tool may be engaged to apply a compressive force to the two components to facilitate the engagement of the sleeve 8 into the locking ring 16. The release bolt 19 may also be screwed into the locking ring 16 to expand the ring 16 as thereby make engagement of the sleeve 8 in the locking ring 16 easier.

Once the sleeve 8 is fully engaged in the locking ring 16, the connection is complete. Each of the pin and hub portions 6, 7 have circumferential seals 23, 24 on their outer surface proximate their ends which are overlapped and engaged by the inner surface of the sleeve 8 when the connection is complete so as to make the connection fluid tight.

Figure 4:
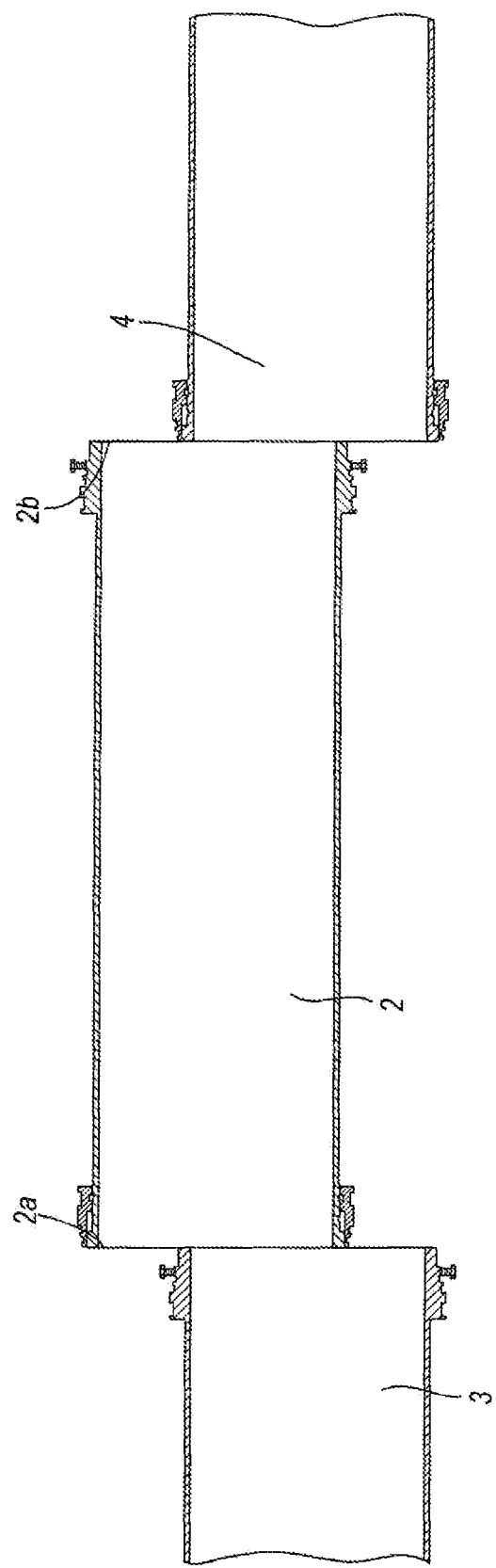
FIG. 4 is a side view of a pipe joint incorporating the pipe connector of the invention being removed from a pipeline.

The connections may equally be released by first expanding the locking ring 16 by screwing in the release 19. Once sufficiently expanded to disengage the teeth 15 of the ring 16 from the teeth 13 of the sleeve 8, the sleeve may be slid along the pipe section 2 towards it disengaged position, withdrawing the overlap with the pin portion 6 and freeing the first end 2a of the pipe section 2 to move radially relative to the abutting pipe end 3. A similar operation is carried on the corresponding connector on the other end 2b of the pipe section 2, whereupon the pipe section 2 can be withdrawn from the pipe line 1 by simple lateral movement relative to the remainder of the pipeline 1, as shown in FIG. 4, and a replacement section inserted and re-connected.

The invention claimed is:

1. A pipe connector comprising:
   a first pipe member having an outer surface and a first end and having teeth formed on the outer surface proximate to but spaced axially apart from the first end;
   a second pipe member having a second end which, in use, is to be connected to the first end of the first pipe member;
   a sleeve slidably mounted on the outer surface of the second pipe member for movement between a first extended position, in which a front end of the sleeve projects beyond the second end of the second pipe member so as, in use, to overlap the first end of the first pipe member when abutted against the second end of the second pipe member, and a second retracted position in which said front end is withdrawn so as at least to be aligned with the second end of the second pipe member, the sleeve having an outer surface and teeth formed on the outer surface at least in the region of the front end, wherein the sleeve is configured so that when the sleeve is in the second retracted position, the abutting first and second ends of the first and second pipe members can move radially apart from each other;
   stop means provided on the second pipe member and the sleeve to prevent axial movement of the sleeve beyond the extended position; and
   a lock ring having an inner cylindrical surface and teeth formed on the inner cylindrical surface and sized to engage both the teeth of the first pipe member and the teeth of the sleeve when the sleeve is overlapping the first end of the first pipe member so as to lock said first pipe member and the sleeve together against relative axial movement.

2. A pipe connector according to claim 1, wherein the stop means comprises an increased diameter section formed on the outer surface of the second pipe member proximate the second end of the second pipe member and a corresponding reduced diameter portion formed on the inner surface of the sleeve, which reduced diameter portion engages with the increased diameter portion of the second pipe member when the sleeve reaches the extended position.

3. A pipe connector according to claim 2, wherein the second pipe member has a step change in external diameter which forms a shoulder which is engaged by a corresponding shoulder formed on the inner surface of the sleeve by a step change in the inner diameter of the sleeve.

4. A pipe connector according to claim 1, wherein the teeth on the sleeve and the first pipe member comprise at least one tooth on each of the first pipe member and the sleeve which extends around the entire circumference of each of the first pipe member and the sleeve.

5. A pipe connector according to claim 1. wherein detent means are associated with at least one of the sleeve and the second pipe member, which detent means operate to deter movement of the sleeve along the second pipe member between the extended and retracted positions when the sleeve is not engaged by the lock ring.

6. A pipe connector according to claim 1 further comprising a circumferentially extending seal provided around the outer surface of each of the first end of the first pipe member and the second end of the second pipe member, the seals being engaged by the inner surface of the sleeve when the first and second ends are abutted against each other and the sleeve moved to the extended position so as to seal the connection therebetween.

7. A pipe connector comprising:
   a first pipe member having an outer surface and a first end and having teeth formed on the outer surface proximate to but spaced axially apart from the first end;
   a second pipe member having a second end which, in use, is to be connected to the first end of the first pipe member;
   a sleeve slidably mounted on the outer surface of the second pipe member for movement between a first extended position, in which a front end of the sleeve projects beyond the second end of the second pipe member so as, in use, to overlap the first end of the first pipe member when abutted against the second end of the second pipe member, and a second retracted position in which said front end is withdrawn so as at least to be aligned with the second end of the second pipe member, the sleeve having an outer surface and teeth formed on the outer surface at least in she region of the front end;
   stop means provided on the second pipe member and the sleeve to prevent axial movement of the sleeve beyond the extended position:
   a lock ring having an inner cylindrical surface and teeth formed on the inner cylindrical surface and sized to engage both the teeth of the first pipe member and the teeth of the sleeve when the sleeve is overlapping the first end of the first pipe member so as to lock said first pipe member and the sleeve together against relative axial movement:
   wherein detent means are associated with at least one of the sleeve and the second pipe member, which detent means operate to deter movement of the sleeve along the second pipe member between the extended and retracted positions when the sleeve is not engaged by the lock ring; and wherein the detent means comprises a split ring which is carried in a circumferential groove formed in the inner surface of the sleeve and which locates in one of a pair of circumferential grooves formed in the outer surface of the second pipe member in order to retain the sleeve in either the extended or the retracted position.

8. A pipe connector comprising:

a first pipe member having an outer surface and a first end and having teeth formed on the outer surface proximate to but spaced axially apart from the first end;

a second pipe member having a second end which, in use, is to be connected to the first end of the first pipe member;

a sleeve slidably mounted on the outer surface of the second pipe member for movement between a first extended position, in which a front end of the sleeve projects beyond the second end of the second pipe member so as, in use, to overlap the first end of the first pipe member when abutted against the second end of the second pipe member, and a second retracted position in which said front end is withdrawn so as at least to be aligned with the second end of the second pipe member, the sleeve having an outer surface and teeth formed on the outer surface at least in the region of the front end;

stop means provided on the second pipe member and the sleeve to prevent axial movement of the ,sleeve beyond the extended position;

a lock ring having an inner cylindrical surface and teeth formed on the inner cylindrical surface and sized to engage both the teeth of the first pipe member and the teeth of the sleeve when the sleeve is overlapping the first end of the first pipe member so as to lock said first pipe member and the sleeve together against relative axial movement; and wherein the lock ring is a split ring and includes at least one radially extending through opening into which a release bolt may be screwed in order to radially expand the lock ring to release it from the sleeve.

9. A pipe connector comprising:

a first pipe member having an outer surface and a first end and having teeth formed on the outer surface proximate to, but spaced axially apart from, the first end;

a second pipe member having a second end which, in use, is to be connected to the first end of the first pipe member;

a sleeve slidably mounted on the outer surface of the second pipe member for movement between a first extended position. in which a front end of the sleeve projects beyond the second end of the second pipe member so as, in use, to overlap the first end or the first pipe member when abutted against the second end of the second pipe member, and a second retracted position in which said front end is withdrawn so as at least to be aligned with the second end of the second pipe member, the sleeve having an outer surface and teeth formed on the Outer surface at least in the region of the front end;

a stop means provided on the second pipe member and the sleeve to prevent axial movement of the sleeve beyond the extended position; and a lock ring having an inner cylindrical surface and teeth formed on the inner cylindrical surface and sized to engage both the teeth of the first pipe member and the teeth of the sleeve when the sleeve is overlapping the first end of the first pipe member so as to lock said first pipe member and the sleeve together against relative axial movement, wherein the lock ring is configured as a split ring that is radially expandable to allow axial engagement of the sleeve into and removal of the sleeve from the lock ring.

10. A pipe connector according to claim 9, wherein the stop means comprises an increased diameter section formed on the outer surface of the second pipe member proximate the second end of the second pipe member and a corresponding reduced diameter portion formed on the inner surface of the sleeve, which reduced diameter portion engages with the increased diameter portion of the second pipe member when the sleeve reaches the extended position.

11. A pipe connector according to claim 10, wherein the second pipe member has a step change in external diameter which forms a shoulder which is engaged by a corresponding shoulder formed on the inner surface of the sleeve by a step change in the inner diameter of the sleeve.

12. A pipe connector according to claim 9, wherein the teeth on the sleeve and the first pipe member comprise at least one tooth on each of the first pipe member and the sleeve which extends around the entire circumference of each of the first pipe member and the sleeve.

13. A pipe connector according to claim 9, wherein detent means are associated with at least one of the sleeve and the second pipe member, which detent means operate to deter movement of the sleeve along the second pipe member between the extended and retracted positions when the sleeve is not engaged by the lock ring.

14. A pipe connector according to claim 9, further comprising a circumferentially extending seal provided around the outer surface of each of the first end of the first pipe member and the second end of the second pipe member, the seals being engaged by the inner surface of the sleeve when the first and second ends are abutted against each other and the sleeve moved to the extended position so as to seal the connection therebetween.

* * * * *

UNITED STATES PATENT AND TRADEMARK OFFICE
CERTIFICATE OF CORRECTION

PATENT NO.        : 9,334,988 B2
APPLICATION NO.   : 14/272976
DATED             : May 10, 2016
INVENTOR(S)       : John Gallagher et al.

It is certified that error appears in the above-identified patent and that said Letters Patent is hereby corrected as shown below:

IN THE CLAIMS

CLAIM 1, column 5, line 59, delete "radically" and substitute therefor -- radially --;

CLAIM 7, column 6, line 53, delete "she" and substitute therefor -- the --;

CLAIM 9, column 7, line 50, delete "." and substitute therefor -- , --;

CLAIM 9, column 8, line 5, delete "Outer" and substitute therefor -- outer --.

Signed and Sealed this
Fifth Day of July, 2016

Michelle K. Lee
*Director of the United States Patent and Trademark Office*